US012799302B2

(12) United States Patent
Ishikawa et al.

(10) Patent No.: US 12,799,302 B2
(45) Date of Patent: Nov. 17, 2026

(54) THERMOPLASTIC RESIN COMPOSITION, AND COMPOUNDING INGREDIENT TO BE ADDED TO SAME

(71) Applicant: MITSUBISHI GAS CHEMICAL COMPANY, INC., Tokyo (JP)

(72) Inventors: Shun Ishikawa, Ibaraki (JP); Mitsutake Suematsu, Tokyo (JP)

(73) Assignee: MITSUBISHI GAS CHEMICAL COMPANY, INC., Tokyo (JP)

( * ) Notice: Subject to any disclaimer, the term of this patent is extended or adjusted under 35 U.S.C. 154(b) by 203 days.

(21) Appl. No.: 18/287,767

(22) PCT Filed: Mar. 24, 2022

(86) PCT No.: PCT/JP2022/013822
§ 371 (c)(1),
(2) Date: Oct. 20, 2023

(87) PCT Pub. No.: WO2022/230471
PCT Pub. Date: Nov. 3, 2022

(65) Prior Publication Data

US 2024/0209181 A1 Jun. 27, 2024

(30) Foreign Application Priority Data

Apr. 26, 2021 (JP) ................................ 2021-074147

(51) Int. Cl.
*C08K 5/109* (2006.01)

(52) U.S. Cl.
CPC ........ *C08K 5/109* (2013.01); *C08K 2201/001* (2013.01)

(58) Field of Classification Search
None
See application file for complete search history.

(56) References Cited

U.S. PATENT DOCUMENTS 10,556,987 B2 * 2/2020 Kato ...................... G02B 1/041
11,634,538 B2 * 4/2023 Ishikawa ................ C08G 64/04 528/160
12,091,498 B2 * 9/2024 Suematsu .............. G02B 1/041
2012/0226011 A1 * 9/2012 Nomura ............. C08G 64/0208 528/200
2018/0307052 A1 10/2018 Kato et al.
2019/0055351 A1 2/2019 Kato et al.
2019/0235258 A1 8/2019 Kato et al.
2020/0071460 A1 3/2020 Ozaki et al.
2021/0054142 A1 2/2021 Ozaki et al.
2022/0025110 A1 1/2022 Suematsu et al.
2023/0235117 A1 7/2023 Suematsu et al.

FOREIGN PATENT DOCUMENTS

EP 632 955 A1 4/2020
EP 632 957 A1 4/2020
EP 174 126 A1 5/2023
JP 2000169573 A * 6/2000
JP 2017-014402 A 1/2017
JP 2018-2893 A 1/2018
JP 2018-2894 A 1/2018
JP 2018-2895 A 1/2018
JP 2018-59074 A 4/2018
WO 2017/078073 A1 5/2017
WO 2017/078074 A1 5/2017
WO 2020/137926 A1 7/2020
WO 2021/014962 A1 1/2021
WO WO-2021261392 A1 * 12/2021 ............. C08L 69/00

OTHER PUBLICATIONS

English translation of WO-2021014962-A1 (Year: 2021).*
English translation of JP-200016953-A (Year: 2000).*
Supplementary European Search Report dated Aug. 26, 2024 in European family member application No. 22 79 5390.8.
International Search Report issued Jun. 21, 2022 in International Bureau of WIPO Patent Application No. PCT/JP2022/013822 with an English translation thereof.
Written Opinion issued Jun. 21, 2022 in International Bureau of WIPO Patent Application No. PCT/JP2022/013822 with an English translation thereof.
Office Action issued in CN Patent Application 202280029442.1, Dec. 31, 2025, translation.

* cited by examiner

*Primary Examiner* — Randy P Gulakowski
*Assistant Examiner* — Audra J Destefano
(74) *Attorney, Agent, or Firm* — GREENBLUM & BERNSTEIN, P.L.C.

(57) ABSTRACT

A thermoplastic resin composition, includes a thermoplastic resin, and an aromatic carbonate oligomer (A) serving as a compounding agent, in which the set number n is 3 or more and less than 15 or the average number of repeating units obtained by mass spectrometry measurement according to field desorption mass spectrometry (FD-MS) is 2 to 6. A compounding agent that is composed of an aromatic carbonate oligomer (A), in which the set number n is 3 or more and less than 15 or the average number of repeating units obtained by mass spectrometry measurement according to field desorption mass spectrometry (FD-MS) is 2 to 6, wherein the compounding agent is added to a thermoplastic resin to reduce the birefringence of a thermoplastic resin composition.

3 Claims, No Drawings

THERMOPLASTIC RESIN COMPOSITION, AND COMPOUNDING INGREDIENT TO BE ADDED TO SAME

TECHNICAL FIELD

The present invention relates to a thermoplastic resin composition. More specifically, the present invention relates to a thermoplastic resin composition comprising a thermoplastic resin and a specific compounding agent.

BACKGROUND ART

As materials for optical lenses used in the optical systems of various types of cameras, such as a camera, a film-integrated camera and a video camera, optical glasses or optical resins have been used. Such optical glasses are excellent in heat resistance, transparency, dimensional stability, chemical resistance and the like. However, the optical glasses are problematic in terms of high material costs, poor formability and low productivity.

On the other hand, an optical lens composed of an optical resin is advantageous in that it can be produced in a large amount by injection molding, and as materials having a high refractive index for use in camera lenses, polycarbonate, polyester carbonate, and polyester resins, etc. can be used.

When such an optical resin is used as an optical lens, the used optical resin is required to have heat resistance, transparency, low water absorbability, chemical resistance, low birefringence, resistance to moist heat, etc., in addition to optical properties such as refractive index and Abbe number. In particular, in recent years, optical lenses having high refractive index and high heat resistance have been required, and thus, various resins have been developed (Patent Literatures 1 to 5).

However, it is still desired to develop a resin composition that can reduce the birefringence of the obtained molded product, without impairing the properties required for optical resin compositions. In particular, it is desired to develop a thermoplastic resin composition that conforms to actual use and has an excellent birefringence-reducing effect, not only before an annealing treatment, but also after such an annealing.

CITATION LIST

Patent Literature

Patent Literature 1: JP Patent Publication (Kokai) No. 2018-2893 A
Patent Literature 2: JP Patent Publication (Kokai) No. 2018-2894 A
Patent Literature 3: JP Patent Publication (Kokai) No. 2018-2895 A
Patent Literature 4: JP Patent Publication (Kokai) No. 2018-59074 A
Patent Literature 5: International Publication WO2017/078073

SUMMARY OF INVENTION

Technical Problem

It is an object of the present invention to provide a thermoplastic resin composition having an excellent birefringence-reducing effect without impairing the properties of optical resin compositions.

Solution to Problem

As a result of intensive studies directed towards achieving the aforementioned object, the present inventors have found that a thermoplastic resin composition having an excellent birefringence-reducing effect without impairing the properties of optical resin compositions can be obtained by adding a specific compounding agent to a thermoplastic resin, thereby completing the present invention.

Specifically, the present invention includes the following aspects.

<1> A thermoplastic resin composition, comprising a thermoplastic resin, and an aromatic carbonate oligomer (A) serving as a compounding agent, in which the set number n is 3 or more and less than 15 or the average number of repeating units obtained by mass spectrometry measurement according to field desorption mass spectrometry (FD-MS) is 2 to 6.

<2> The thermoplastic resin composition according to the above <1>, wherein the aromatic carbonate oligomer (A) comprises a diol-derived constituent unit represented by the following general formula (1) or the following general formula (2):

(1)

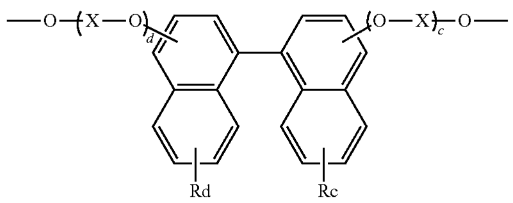

wherein $R_c$ and $R_d$ are each independently selected from a halogen atom, an alkyl group containing 1 to 20 carbon atoms, an alkoxy group containing 1 to 20 carbon atoms, a cycloalkyl group containing 5 to 20 carbon atoms, a cycloalkoxy group containing 5 to 20 carbon atoms, an aryl group containing 6 to 20 carbon atoms, a heteroaryl group containing 6 to 20 carbon atoms, which comprises one or more heterocyclic atoms selected from O, N and S, or an aryloxy group containing 6 to 20 carbon atoms, and $—C≡C—R_h$, wherein $R_h$ represents an aryl group containing 6 to 20 carbon atoms, or a heteroaryl group containing 6 to 20 carbon atoms, which comprises one or more heterocyclic atoms selected from O, N and S, X represents a saturated carbon group containing 1 to 5 carbon atoms, and c and d each independently represent an integer of 0 to 10, or (2)

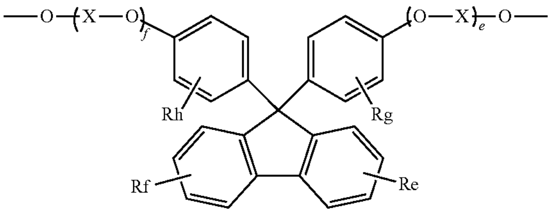

wherein $R_e$ and $R_f$ each independently represent a hydrogen atom, a fluorine atom, a chlorine atom, a bromine atom, an iodine atom, an alkyl group containing 1 to 20 carbon atoms, or an aryl group containing 6 to 20 carbon atoms which may optionally comprise a heterocyclic atom selected from O, N and S, an alkenyl group containing 2 to 20 carbon atoms, an alkoxy group containing 1 to 20 carbon atoms or an aralkyl group containing 7 to 20 carbon atoms, $R_g$ and $R_h$ are each independently selected from a hydrogen atom, a halogen atom, an alkyl group containing 1 to 20 carbon atoms, an alkoxy group containing 1 to 20 carbon atoms, a cycloalkyl group containing 5 to 20 carbon atoms, a cycloalkoxy group containing 5 to 20 carbon atoms, an aryl group containing 6 to 20 carbon atoms, a heteroaryl group containing 6 to 20 carbon atoms, which comprises one or more heterocyclic atoms selected from O, N and S, or an aryloxy group containing 6 to 20 carbon atoms, and $-C \equiv C-R_h$, wherein $R_h$ represents an aryl group containing 6 to 20 carbon atoms, or a heteroaryl group containing 6 to 20 carbon atoms, which comprises one or more heterocyclic atoms selected from O, N and S, X represents a saturated carbon group containing 1 to 5 carbon atoms, and e and f each independently represent an integer of 0 to 10.

<3>

The thermoplastic resin composition according to the above <2>, wherein, in the general formula (2), $R_e$, $R_f$, $R_g$ and $R_h$ each independently represent a hydrogen atom, a methyl group or a phenyl group, X represents an ethylene group, and e and f each independently represent 0 or 1.

<4>

The thermoplastic resin composition according to any one of the above <1> to <3>, wherein the set number n of the aromatic carbonate oligomer (A) is 3 or more and 10 or less.

<5>

The thermoplastic resin composition according to any one of the above <1> to <3>, wherein the aromatic carbonate oligomer (A) is a polymer having a molar ratio of the diol represented by the general formula (1) or the general formula (2):diphenyl carbonate=1:1.2 to 1:10.0.

<6>

The thermoplastic resin composition according to any one of the above <1> to <5>, wherein the thermoplastic resin comprises a monomer-derived constituent unit (B) represented by the following general formula (3):

(3)

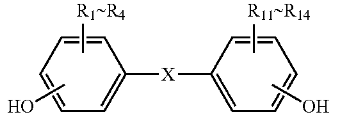

wherein $R_1$ to $R_4$ and $R_{11}$ to $R_{14}$ each independently represent hydrogen, fluorine, chlorine, bromine or iodine, or an alkyl group containing 1 to 20 carbon atoms, an aryl group containing 6 to 12 carbon atoms, an alkenyl group containing 2 to 12 carbon atoms, an alkoxy group containing 1 to 5 carbon atoms or an aralkyl group containing 7 to 17 carbon atoms, each of which may optionally have a substituent, X represents the following:

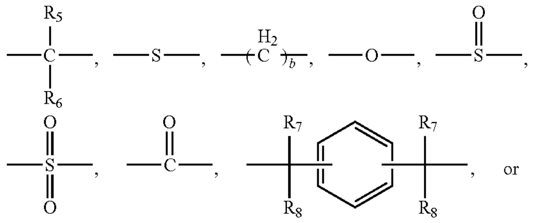

or

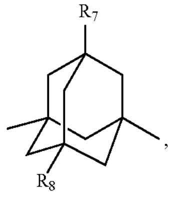

wherein $R_5$ and $R_6$ each independently represent hydrogen, fluorine, chlorine, bromine or iodine, or an alkyl group containing 1 to 20 carbon atoms, an alkoxy group containing 1 to 5 carbon atoms or an aryl group containing 6 to 12 carbon atoms, each of which may optionally have a substituent, or $R_5$ and $R_6$ bind to each other to represent a group that forms a carbocyclic ring containing 5 to 20 carbon atoms, or a heterocyclic ring having 5 to 12 elements, $R_7$ and $R_8$ each independently represent hydrogen, fluorine, chlorine, bromine or iodine, or an alkyl group containing 1 to 9 carbon atoms, an alkoxy group containing 1 to 5 carbon atoms, an alkenyl group containing 2 to 12 carbon atoms, or an aryl group containing 6 to 12 carbon atoms, each of which may optionally have a substituent, and b represents an integer of 0 to 20.

<7>

The thermoplastic resin composition according to any one of the above <1> to <6>, wherein the set number n of the thermoplastic resin is 15 to 1000.

<8>

The thermoplastic resin composition according to any one of the above <1> to <7>, wherein the thermoplastic resin is selected from the group consisting of a polycarbonate resin, a polyester resin and a polyester carbonate resin.

<9>

The thermoplastic resin composition according to any one of the above <1> to <8>, wherein the compounding agent is comprised in an amount of 0.1% by mass to 20% by mass, based on the total mass of the thermoplastic resin composition.

<10>

The thermoplastic resin composition according to any one of the above <1> to <9>, wherein an antioxidant and/or a mold release agent are further comprised in each amount of 0.01% by mass to 1% by mass, based on the total mass of the thermoplastic resin composition.

<11>

A molded body, comprising the thermoplastic resin composition according to any one of the above <1> to <10 >.

<12>

A compounding agent composed of an aromatic carbonate oligomer (A), in which the set number n is 3 or more and less than 15 or the average number of repeating units obtained by mass spectrometry measurement according to field desorption mass spectrometry (FD-MS) is 2 to 6, wherein the compounding agent is added to a thermoplastic resin to reduce the birefringence of a thermoplastic resin composition.

<13>

The compounding agent according to the above <12>, wherein the aromatic carbonate oligomer (A) comprises a diol-derived constituent unit represented by the following general formula (1) or the following general formula (2):

(1)

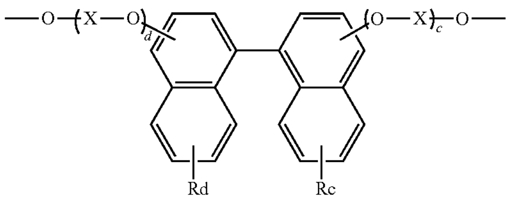

wherein $R_c$ and $R_d$ are each independently selected from a halogen atom, an alkyl group containing 1 to 20 carbon atoms, an alkoxy group containing 1 to 20 carbon atoms, a cycloalkyl group containing 5 to 20 carbon atoms, a cycloalkoxy group containing 5 to 20 carbon atoms, an aryl group containing 6 to 20 carbon atoms, a heteroaryl group containing 6 to 20 carbon atoms, which comprises one or more heterocyclic atoms selected from O, N and S, or an aryloxy group containing 6 to 20 carbon atoms, and —C≡C—$R_h$, wherein $R_h$ represents an aryl group containing 6 to 20 carbon atoms, or a heteroaryl group containing 6 to 20 carbon atoms, which comprises one or more heterocyclic atoms selected from O, N and S, X represents a saturated carbon group containing 1 to 5 carbon atoms, and c and d each independently represent an integer of 0 to 10, or (2)

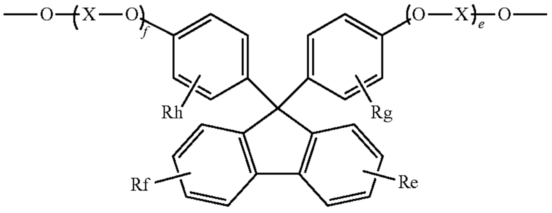

wherein $R_e$ and $R_f$ each independently represent a hydrogen atom, a fluorine atom, a chlorine atom, a bromine atom, an iodine atom, an alkyl group containing 1 to 20 carbon atoms, or an aryl group containing 6 to 20 carbon atoms which may optionally comprise a heterocyclic atom selected from O, N and S, an alkenyl group containing 2 to 20 carbon atoms, an alkoxy group containing 1 to 20 carbon atoms or an aralkyl group containing 7 to 20 carbon atoms, $R_g$ and $R_h$ are each independently selected from a hydrogen atom, a halogen atom, an alkyl group containing 1 to 20 carbon atoms, an alkoxy group containing 1 to 20 carbon atoms, a cycloalkyl group containing 5 to 20 carbon atoms, a cycloalkoxy group containing 5 to 20 carbon atoms, an aryl group containing 6 to 20 carbon atoms, a heteroaryl group containing 6 to 20 carbon atoms, which comprises one or more heterocyclic atoms selected from O, N and S, or an aryloxy group containing 6 to 20 carbon atoms, and —C≡C—$R_h$, wherein $R_h$ represents an aryl group containing 6 to 20 carbon atoms, or a heteroaryl group containing 6 to 20 carbon atoms, which comprises one or more heterocyclic atoms selected from O, N and S, X represents a saturated carbon group containing 1 to 5 carbon atoms, and e and f each independently represent an integer of 0 to 10.

Advantageous Effects of Invention

According to the present invention, a thermoplastic resin composition having an excellent birefringence-reducing effect without impairing the properties of optical resin compositions can be provided.

DESCRIPTION OF EMBODIMENTS

1. Thermoplastic Resin Composition

The thermoplastic resin composition of the present invention comprises a thermoplastic resin, and an aromatic carbonate oligomer (A) serving as a compounding agent, in which the set number n is 3 or more and less than 15 or the average number of repeating units obtained by mass spectrometry measurement according to field desorption mass spectrometry (FD-MS) is 2 to 6. By mixing the above-described specific compounding agent into the thermoplastic resin, a thermoplastic resin composition having an excellent birefringence-reducing effect without impairing the properties of optical resin compositions can be obtained.

1-1. Compounding Agent

In the thermoplastic resin composition of the present invention, the above-described compounding agent is preferably an aromatic carbonate oligomer (A) comprising a diol-derived constituent unit represented by the following general formula (1) or the following general formula (2). The above-described aromatic carbonate oligomer (A) may be used alone as a single type, or may also be used in combination of two or more types.

(1)

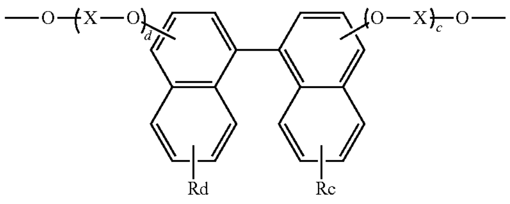

In the above general formula (1), $R_c$ and $R_d$ are each independently selected from a halogen atom, an alkyl group containing 1 to 20 carbon atoms, an alkoxy group containing 1 to 20 carbon atoms, a cycloalkyl group containing 5 to 20 carbon atoms, a cycloalkoxy group containing 5 to 20 carbon atoms, an aryl group containing 6 to 20 carbon atoms, a heteroaryl group containing 6 to 20 carbon atoms, which comprises one or more heterocyclic atoms selected from O, N and S, or an aryloxy group containing 6 to 20 carbon atoms, and —C≡C—$R_h$, wherein $R_h$ represents an aryl group containing 6 to 20 carbon atoms, or a heteroaryl group containing 6 to 20 carbon atoms, which comprises one or more heterocyclic atoms selected from O, N and S, X represents a saturated carbon group containing 1 to 5 carbon atoms, and c and d each independently represent an integer of 0 to 10.

(2)

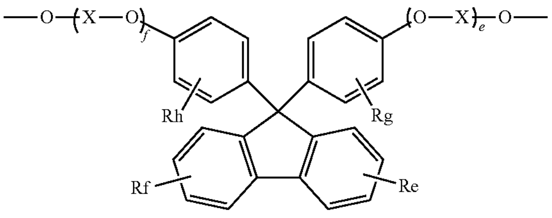

In the general formula (2), $R_e$ and $R_f$ each independently represent a hydrogen atom, a fluorine atom, a chlorine atom, a bromine atom, an iodine atom, an alkyl group containing 1 to 20 carbon atoms, or an aryl group containing 6 to 20 carbon atoms which may optionally comprise a heterocyclic atom selected from O, N and S, an alkenyl group containing 2 to 20 carbon atoms, an alkoxy group containing 1 to 20 carbon atoms or an aralkyl group containing 7 to 20 carbon atoms, $R_g$ and $R_h$ are each independently selected from a hydrogen atom, a halogen atom, an alkyl group containing 1 to 20 carbon atoms, an alkoxy group containing 1 to 20 carbon atoms, a cycloalkyl group containing 5 to 20 carbon atoms, a cycloalkoxy group containing 5 to 20 carbon atoms, an aryl group containing 6 to 20 carbon atoms, a heteroaryl group containing 6 to 20 carbon atoms, which comprises one or more heterocyclic atoms selected from O, N and S, or an aryloxy group containing 6 to 20 carbon atoms, and —C≡C—$R_h$, wherein $R_h$ represents an aryl group containing 6 to 20 carbon atoms, or a heteroaryl group containing 6 to 20 carbon atoms, which comprises one or more heterocyclic atoms selected from O, N and S, X represents a saturated carbon group containing 1 to 5 carbon atoms, and e and f each independently represent an integer of 0 to 10.

Constituent Units of Compounding Agent

<Constituent Unit Represented by General Formula (1) >

In a preferred embodiment of the present invention, in the above general formula (1), $R_c$ and $R_d$ are each independently selected from an aryl group containing 6 to 20 carbon atoms, a heteroaryl group containing 6 to 20 carbon atoms, which comprises one or more heterocyclic atoms selected from O, N and S, or an aryloxy group containing 6 to 20 carbon atoms, and —C≡C—$R_h$, wherein $R_h$ represents an aryl group containing 6 to 20 carbon atoms, or a heteroaryl group containing 6 to 20 carbon atoms, which comprises one or more heterocyclic atoms selected from O, N and S.

In the general formula (1), the aryl group contains preferably 6 to 18, more preferably 6 to 16, further preferably 6 to 14, still further preferably 6 to 12, and particularly preferably 6 to 10 carbon atoms.

In the general formula (1), the heteroaryl group contains preferably 6 to 18, more preferably 8 to 16, and further preferably 10 to 14 carbon atoms.

In the general formula (1), the aryloxy group contains preferably 6 to 18, more preferably 6 to 16, and further preferably 6 to 14 carbon atoms.

In the general formula (1), X is preferably an alkylene group containing 1 to 4 carbon atoms, more preferably an alkylene group containing 1 to 3 carbon atoms, and particularly preferably an alkylene group containing 2 carbon atoms.

In the general formula (1), c and d each independently represent, preferably an integer of 0 to 5, more preferably an integer of 1 to 5, further preferably an integer of 1 to 3, and particularly preferably 1.

In a preferred embodiment of the present invention, in the general formula (1), $R_c$ and $R_d$ may be each independently selected from a phenyl group, a naphthyl group, or the following group:

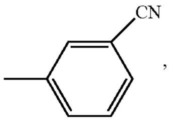,
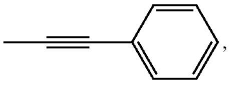,

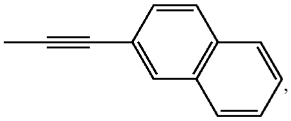,
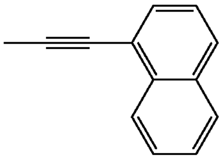

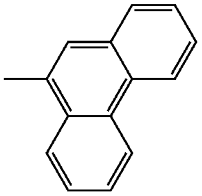,
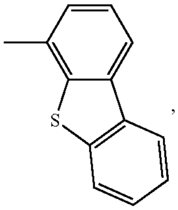,

-continued

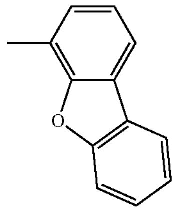

X represents an alkylene group containing 1 to 4 carbon atoms, more preferably an alkylene group containing 1 to 3 carbon atoms, and particularly preferably an alkylene group containing 2 carbon atoms, and c and d each independently represent an integer of 0 to 5, more preferably an integer of 1 to 5, further preferably an integer of 1 to 3, and particularly preferably 1.

In the present invention, the constituent unit represented by the general formula (1) is particularly preferably a constituent unit represented by the following formula:

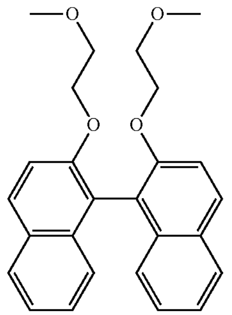

<Constituent Unit Represented by General Formula (2) >

In a preferred embodiment of the present invention, in the above general formula (2), $R_e$ and $R_f$ each independently represent a hydrogen atom, a fluorine atom, a chlorine atom, a bromine atom, an iodine atom, an alkyl group containing 1 to 10 carbon atoms, or an aryl group containing 6 to 18 carbon atoms which may optionally comprise a heterocyclic atom selected from O, N and S, an alkenyl group containing 2 to 15 carbon atoms, an alkoxy group containing 1 to 5 carbon atoms or an aralkyl group containing 7 to 17 carbon atoms. In particular, it is preferable that $R_e$ and $R_f$ each independently represent a hydrogen atom, a methyl group or a phenyl group.

In the general formula (2), $R_g$ and $R_h$ are each independently selected from a hydrogen atom, an alkyl group containing 1 to 20 carbon atoms, an aryl group containing 6 to 20 carbon atoms, a heteroaryl group containing 6 to 20 carbon atoms, which comprises one or more heterocyclic atoms selected from O, N and S, or an aryloxy group containing 6 to 20 carbon atoms, and —C≡C—$R_h$. $R_h$ represents an aryl group containing 6 to 20 carbon atoms, or a heteroaryl group containing 6 to 20 carbon atoms, which comprises one or more heterocyclic atoms selected from O, N and S. In particular, it is preferable that $R_g$ and $R_h$ each independently represent a hydrogen atom, a methyl group or a phenyl group.

In the general formula (2), the alkyl group may be preferably an alkyl group containing 1 to 6 carbon atoms, and more preferably methyl.

In the general formula (2), the aryl group may be an aryl group containing preferably 6 to 16, more preferably 6 to 14, further preferably 6 to 12, and particularly preferably 6 to 10 carbon atoms.

In the general formula (2), the alkenyl group may be preferably an alkenyl group containing 2 to 10 carbon atoms.

In the general formula (2), the alkoxy group may be preferably an alkoxy group containing 1 to 3 carbon atoms.

In the general formula (2), the aralkyl group may be preferably an aralkyl group containing 7 to 10 carbon atoms.

In the general formula (2), X may be preferably an alkylene group containing 1 to 4 carbon atoms, more preferably an alkylene group containing 1 to 3 carbon atoms, and particularly preferably an alkylene group containing 2 carbon atoms.

In the general formula (2), e and f may each independently be preferably an integer of 0 to 5, more preferably an integer of 0 to 3, and particularly preferably 0 or 1.

In the present invention, the constituent unit represented by the general formula (2) is particularly preferably a constituent unit represented by the following formula:

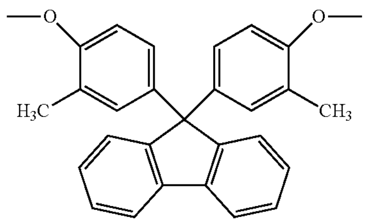

Aspects of Compounding Agent

In a preferred embodiment of the present invention, the aromatic carbonate oligomer (A) comprising the constituent unit represented by the above general formula (1) or (2) as a diol structure may be represented by any of the following general formula (1') or (2'). The symbols used in the following general formula (1') are the same as those in the above general formula (1), and the symbols used in the following general formula (2') are the same as those in the above general formula (2).

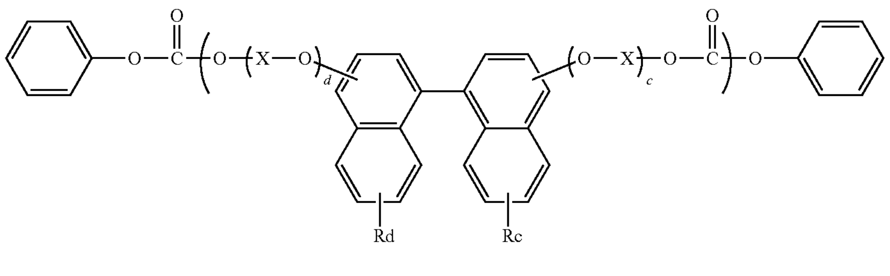

(1')

-continued (2′)

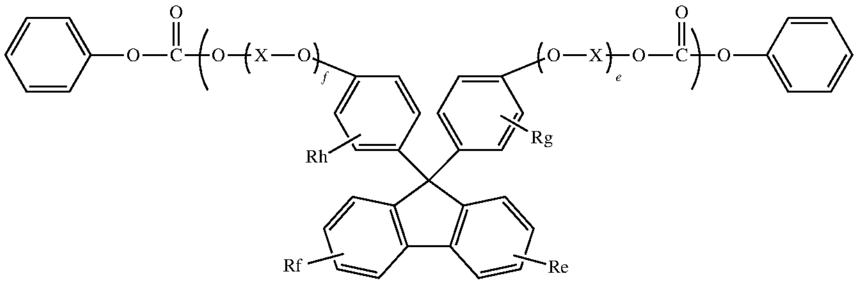

In the aromatic carbonate oligomer (A) used in the present invention, the set number n is 3 or more and less than 15, or the average number of repeating units obtained by mass spectrometry measurement according to field desorption mass spectrometry (FD-MS) is 2 to 6.

The set number n is a value that is derived from the numerical values used in oligomer production and can be applied only to oligomers produced by an interface method.

Specifically, the set number n can be calculated according to the following equation, in which the amount of substance (mole) of a diol is defined to be "a" and the amount of substance (mole) of an end terminator is defined to be "b". It is to be noted that the set number n of a monomer is "0" without the association of an end terminator.

$$n = \frac{a \times 2}{b}$$

The set number n of the aromatic carbonate oligomer (A) is preferably 3 to 10, and is more preferably 7 to 10.

An oligomer produced by a melting method cannot be specified with the set number n. However, such an oligomer can be specified with the average number of repeating units obtained by mass spectrometry measurement according to field desorption mass spectrometry (FD-MS).

Specifically, the method described in the after-mentioned Examples can be adopted, and the average number of repeating units of the aromatic carbonate oligomer can be calculated by dividing the mass peak m/z of the aromatic carbonate oligomer obtained by the measurement according to field desorption mass spectrometry (FD-MS) by the molecular weight of a monomer unit.

The average number of repeating units of the aromatic carbonate oligomer (A) obtained by mass spectrometry measurement according to field desorption mass spectrometry (FD-MS) is preferably 3 to 6, and is more preferably 3 to 4.

Method for Producing Aromatic Carbonate Oligomer (A) Serving as Compounding Agent <Interface Method >

The aromatic carbonate oligomer (A) can be preferably produced according to an interface method. As an example of the interface method, for example, diol and hydrosulfite are added to a sodium hydroxide aqueous solution and are dissolved therein. To this solution, dichloromethane is added, and thereafter, the temperature of the obtained solution is set to be 10 °C to 30 °C, while stirring. Further, phosgene is blown into the solution over 10 to 60 minutes. After the blowing of phosgene is completed, p-tert-butylphenol (PTBP) dissolved in dichloromethane is added to the resulting solution, and the thus obtained solution is intensively stirred for a predetermined period of time, so that it is emulsified. Thereafter, a polymerization catalyst is added to the resulting solution and is polymerized for about 10 to 60 minutes. The polymerized solution is separated into a water layer and an organic layer, and the organic layer is neutralized with phosphoric acid, and is then washed with pure water repeatedly, until the pH of the washing liquid became pH 7.0. The organic solvent is distilled away from the thus purified substance by evaporation, so that the aromatic carbonate oligomer (A) can be obtained.

<Melting Method >

The aromatic carbonate oligomer (A) can also be produced according to a transesterification method. For example, diol is mixed with an excessive amount of bisaryl carbonate, and these substances are reacted in the presence of a transesterification catalyst under reduced pressure at a high temperature. With regard to the molar ratio between the diol and the bisaryl carbonate, diol:bisaryl carbonate=1:1.2 to 1:10 is preferable, and diol:bisaryl carbonate=1:1.2 to 1:5 is more preferable. In the aromatic carbonate oligomer (A) obtained according to the melting method, the number of repeating units is not uniform, and the aromatic carbonate oligomer (A) is an aggregate of molecular chains with a different number of repeating units, and is a mixture that may also contain unreacted bisaryl carbonate and diol.

Content of Compounding Agent

In one embodiment of the present invention, the above-described compounding agent is comprised in the thermoplastic resin composition in an amount of preferably 0.1% by mass to 20% by mass, more preferably 2.5% by mass to 20% by mass, further preferably 5% by mass to 20% by mass, and particularly preferably 10% by mass to 20% by mass, based on the total mass of the thermoplastic resin composition. In addition, the upper limit value of the content of the compounding agent is more preferably 15% by mass. In the present invention, when the content of the compounding agent is within the above-described range, a thermoplastic resin composition having an excellent birefringence-reducing effect without impairing the properties of optical resin compositions can be provided.

1-2. Thermoplastic Resin

Preferred examples of the thermoplastic resin that can be used in the thermoplastic resin composition of the present invention may include, but are not limited to, a polycarbonate resin, a polyester resin and a polyester carbonate resin. In one embodiment of the present invention, the thermoplastic resin can be selected from the group consisting of a polycarbonate resin, a polyester resin and a polyester carbonate resin.

Physical Properties of Thermoplastic Resin (1) Refractive Index

The thermoplastic resin of the present invention is characterized in that it has a high refractive index, and the refractive index measured at 25 °C at a measurement wavelength of 589 nm (hereinafter also abbreviated as "nd" at times) is preferably 1.650 to 1.720, more preferably 1.660 to 1.710, and further preferably 1.670 to 1.700.

(2) Glass Transition Temperature

In addition, the thermoplastic resin of the present invention is also characterized in that it has high heat resistance, and the glass transition temperature thereof (hereinafter also abbreviated as "Tg" at times) is preferably 120 °C to 160 °C, and more preferably 130 °C to 155 °C.

(3) Set Number n

In one embodiment of the present invention, the set number n of the thermoplastic resin is preferably 15 to 1000, more preferably 20 to 500, and particularly preferably 25 to 55.

It is to be noted that the method of obtaining the set number n of the thermoplastic resin is the same as the aforementioned method of obtaining the set number n of the compounding agent.

Configuration of Thermoplastic Resin

In one embodiment of the present invention, the thermoplastic resin preferably comprises a monomer-derived constituent unit (B) represented by the following general formula (3). In the present invention, the thermoplastic resin may comprise one type of constituent unit derived from the compound represented by the following general formula (3), or may also comprise two or more types of the constituent units.

(3)

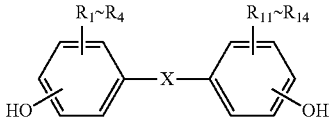

In the general formula (3), $R_1$ to $R_4$ and $R_{11}$ to $R_{14}$ each independently represent hydrogen, fluorine, chlorine, bromine or iodine, or an alkyl group containing 1 to 20 carbon atoms, an aryl group containing 6 to 12 carbon atoms, an alkenyl group containing 2 to 12 carbon atoms, an alkoxy group containing 1 to 5 carbon atoms or an aralkyl group containing 7 to 17 carbon atoms, each of which may optionally have a substituent, X represents the following:

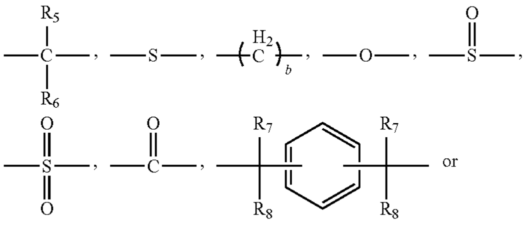

or

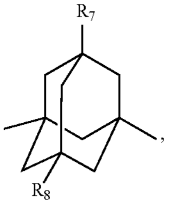

wherein $R_5$ and $R_6$ each independently represent hydrogen, fluorine, chlorine, bromine or iodine, or an alkyl group containing 1 to 20 carbon atoms, an alkoxy group containing 1 to 5 carbon atoms or an aryl group containing 6 to 12 carbon atoms, each of which may optionally have a substituent, or $R_5$ and $R_6$ bind to each other to represent a group that forms a carbocyclic ring containing 5 to 20 carbon atoms, or a heterocyclic ring having 5 to 12 elements, $R_7$ and $R_8$ each independently represent hydrogen, fluorine, chlorine, bromine or iodine, or an alkyl group containing 1 to 9 carbon atoms, an alkoxy group containing 1 to 5 carbon atoms, an alkenyl group containing 2 to 12 carbon atoms, or an aryl group containing 6 to 12 carbon atoms, each of which may optionally have a substituent, and b represents an integer of 0 to 20.

In one embodiment of the present invention, the thermoplastic resin is particularly preferably a polycarbonate resin represented by the following structural formula:

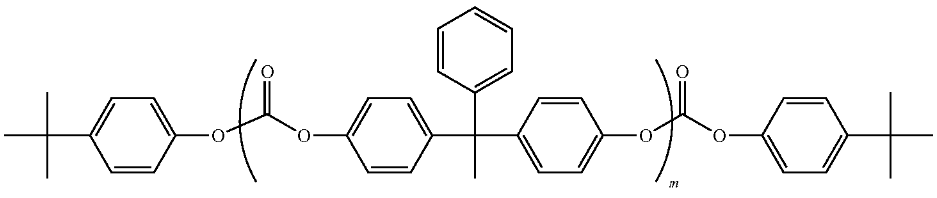

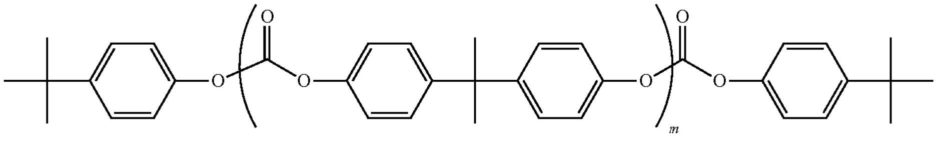

<Polycarbonate Resin >

The polycarbonate resin used in the thermoplastic resin composition of the present invention may comprise, as a diol component(s), one or more types of constituent units derived from the compound represented by the above general formula (3). In the present invention, the polycarbonate resin may comprise one type of constituent unit derived from the compound represented by the above general formula (3), or may also comprise two or more types of the constituent units. The polycarbonate resin used in the thermoplastic resin composition of the present invention may comprise other diol components as constituent units thereof.

<Method for Producing Polycarbonate Resin >

The polycarbonate resin can be produced according to an ordinary method.

In the phosgene method, in general, diol is allowed to react with phosgene in the presence of an acid binder and a solvent. As such an acid binder, for example, pyridine, or a hydroxide of an alkaline metal, such as sodium hydroxide or potassium hydroxide, is used. As such a solvent, for example, methylene chloride, chloroform, or the like is used. Furthermore, in order to promote a polycondensation reaction, a catalyst that is a tertiary amine such as triethylamine or a quaternary ammonium salt such as benzyltriethylammonium chloride is preferably used. Further, for the control of a polymerization degree, a monofunctional group compound such as phenol, p-t-butylphenol, p-cumylphenol, or alkyl-substituted phenol is preferably added as a molecular weight modifier. Further, as desired, an antioxidant such as sodium sulfite or hydrosulfite, or a branching agent such as phloroglucin or isatin bisphenol, may also be added in a small amount. It is appropriate to set the reaction temperature to be in a temperature range of generally 0 °C to 150 °C, and preferably 5 °C to 40 °C. The reaction time depends on the reaction temperature, and it is generally 0.5 minutes to 10 hours, and preferably 1 minute to 2 hours. In addition, during the reaction, the pH in the reaction system is desirably retained at pH 10 or more.

On the other hand, in the transesterification method, diol is mixed with bisaryl carbonate, and the mixture is reacted under reduced pressure at a high temperature. Examples of the bisaryl carbonate may include bisaryl carbonates such as diphenyl carbonate, di-p-tolyl carbonate, phenyl-p-tolyl carbonate, di-p-chlorophenyl carbonate, and dinaphthyl carbonate. These compounds can be used alone as a single type, or can also be used in combination of two or more types. The reaction is carried out in a temperature range of generally 150 °C to 350 °C, and preferably 200 °C to 300 °C. The pressure reduction degree is set such that the final pressure reduction degree can be preferably 1 mmHg or less, so that phenols derived from the bisaryl carbonates generated by the transesterification reaction are distilled away from the reaction system. The reaction time depends on the reaction temperature, the pressure reduction degree, and the like, and the reaction time is generally about 1 to 24 hours. The reaction is preferably carried out in an inert gas atmosphere such as nitrogen or argon.

The content of the dicarboxylic acid chloride, phosgene, or bisaryl carbonate is preferably less than 42 mol %, more preferably less than 30 mol %, and further preferably less than 20 mol %, with respect to 100 mol % of the dicarboxylic acid component.

<Polyester Resin >

In the polyester resin used in the thermoplastic resin composition of the present invention, examples of the diol component may include, but are not limited to, bisphenols and binaphthols. In one embodiment of the present invention, the polyester resin used in the thermoplastic resin composition of the present invention may comprise, as a diol component(s), one or more types of constituent units derived from the compound represented by the above general formula (3). In the present invention, the polyester resin may comprise one type of constituent unit derived from the compound represented by the above general formula (3), or may also comprise two or more types of the constituent units. The polyester resin used in the thermoplastic resin composition of the present invention may further comprise other diol components as constituent units thereof.

In one embodiment of the present invention, examples of the dicarboxylic acid component that can be used in the polyester resin may include: aliphatic dicarboxylic acid components such as malonic acid, succinic acid, glutaric acid, adipic acid, pimelic acid, suberic acid, azelaic acid, methylmalonic acid, and ethylmalonic acid; monocyclic aromatic dicarboxylic acid components such as phthalic acid, isophthalic acid, and terephthalic acid; polycyclic aromatic dicarboxylic acid components such as 2,7-naphthalenedicarboxylic acid, 2,3-naphthalene dicarboxylic acid, 1,4-naphthalene dicarboxylic acid, 1,8-naphthalene dicarboxylic acid, anthracenedicarboxylic acid, and phenanthenedicarboxylic acid; biphenyldicarboxylic acid components such as 2,2'-biphenyldicarboxylic acid; and alicyclic dicarboxylic acid components such as 1,4-cyclodicarboxylic acid and 2,6-decalindicarboxylic acid. These components may be used alone or in combination of two or more types. In addition, as derivatives of these components, acid chlorides or esters may be used. Among these, monocyclic aromatic dicarboxylic acid components, polycyclic aromatic dicarboxylic acid components, and biphenyl dicarboxylic acid components are preferable because these components can provide higher heat resistance and higher refractive index.

In one embodiment of the present invention, examples of other diol components used in the polyester resin may include: aliphatic diol components such as ethylene glycol, propanediol, butanediol, pentanediol, hexanediol, heptanediol, octanediol, and nonanediol; alicyclic diol components such as tricyclo[5.2.1.02,6]decanedimethanol, cyclohexane-1,4-dimethanol, decalin-2,6-dimethanol, norbornan dimethanol, pentacyclopentadecane dimethanol, cyclopentane-1,3-dimethanol, spiroglycol, and isosorbide; and aromatic diol components such as hydroquinone, resorcinol, 2,2-bis(4-hydroxyphenyl)propane, 2,2-bis(3-methyl-4-hydroxyphenyl)propane, 1,1-bis(4-hydroxyphenyl)-1-phenylethane, bis(4-hydroxyphenyl)diphenylmethane, 1,3-bis(2-(4-hydroxyphenyl)-2-propyl)benzene, bis(4-hydroxyphenyl)sulfone, bis(4-(2-hydroxyethoxy)phenyl)sulfone, bis(4-hydroxyphenyl)sulfide, 1,1-bis(4-hydroxyphenyl)cyclohexane, biphenol, 2,2'-bis(2-hydroxyethoxy)-1,1'-binaphthyl, 1,1'-bi-2-naphthol, dihydroxynaphthalene, bis(2-hydroxyethoxy)naphthalene, and 10,10-bis(4-hydroxyphenyl)anthrone. These components may be used alone or in combination of two or more types. Among these components, ethylene glycol and 2,2'-bis(2-hydroxyethoxy)-1,1'-binaphthyl are preferable because these components easily suppress a reduction in heat resistance and refractive index, while enhancing moldability.

<Method for Producing Polyester Resin >

The polyester resin can be produced according to an ordinary method.

The polyester resin used in the thermoplastic resin composition of the present invention may be obtained by subjecting dicarboxylic acid and a diol compound to an esterification reaction or a transesterification reaction, and then subjecting the obtained reaction product to a polycondensation reaction to form a polymer having a desired molecular weight.

Specifically, it is preferable that a diol component is mixed with a dicarboxylic acid component or a diester thereof, for example, in the presence of inert gas, and that the mixture is then reacted under reduced pressure at a temperature of generally 120 °C to 350 °C, and preferably 150 °C to 300 °C. The pressure reduction degree is gradually changed, and finally, the pressure is reduced to 0.13 kPa or less, and the generated water or alcohols are distilled away from the reaction system. The reaction time is generally about 1 to 10 hours.

As a polymerization catalyst, any known catalyst can be employed. For example, an antimony compound, a titanium compound, a germanium compound, a tin compound, or an aluminum compound is preferable. Examples of such compounds may include the oxides, acetates, carboxylates, hydrides, alcoholates, halides, carbonates and sulfates of, antimony, titanium, germanium, tin, and aluminum. Also, these compounds can be used in combination of two or more types. Among these, tin, titanium, and germanium compounds are preferable, from the viewpoint of the melt stability and hue of the thermoplastic resin.

As a transesterification catalyst, any known catalyst can be employed. For example, a compound comprising a manganese, magnesium, titanium, zinc, aluminum, calcium, cobalt, sodium, lithium, or lead element can be used. specific examples of the transesterification catalyst may include oxides, acetates, carboxylates, hydrides, alcoholates, halides, carbonates and sulfates, each comprising these elements. Among these, compounds, such as the oxides, acetates, alcoholates, etc. of manganese, magnesium, zinc, titanium, and cobalt, are preferable, from the viewpoint of the melt stability and hue of the thermoplastic resin, and small amounts of polymer insoluble foreign matters. Further, manganese, magnesium, and titanium compounds are preferable. These compounds can be used in combination of two or more types.

<Polyester Carbonate Resin >

The polyester carbonate resin used in the thermoplastic resin composition of the present invention may comprise one or more types of constituent units derived from the compound represented by the above general formula (3). In the present invention, the polyester carbonate resin may comprise one type of constituent unit derived from the compound represented by the above general formula (3) alone, or may also comprise two or more types of the constituent units.

The polyester carbonate resin used in the thermoplastic resin composition of the present invention may comprise diol components other than the constituent unit derived from the compound represented by the above general formula (3).

<Method for Producing Polyester Carbonate Resin >

The polyester carbonate resin can be produced according to an ordinary method.

The polyester carbonate resin used in the thermoplastic resin composition of the present invention can be produced by combining the phosgene method of reacting dicarboxylic acid and a diol compound with dicarboxylic acid chloride or phosgene, or the transesterification method of reacting diol, dicarboxylic acid and bisaryl carbonate with one another, with the esterification reaction or transesterification reaction of dicarboxylic acid and a diol compound. The esterification reaction, the transesterification reaction, the phosgene method, and the transesterification method are as described above.

Additives

To the thermoplastic resin of the present invention, as necessary, additives such as a thermal stabilizer, an antioxidant, a mold release agent, a plasticizer, a filler, an ultraviolet absorber, a rust inhibitor, a dispersant, an antifoaming agent, and a leveling agent are appropriately added, and the obtained mixture can be used as a thermoplastic resin composition.

<Antioxidant >

The thermoplastic resin composition preferably comprises an antioxidant as an additive described above.

As such an antioxidant, the present thermoplastic resin composition preferably comprises at least one of a phenolic antioxidant and a phosphite-based antioxidant.

Examples of the phenolic antioxidant may include 1,3,5-tris(3,5-di-tert-butyl-4-hydroxyphenylmethyl)-2,4,6-trimethylbenzene, 1,3,5-tris(3,5-di-tert-butyl-4-hydroxybenzyl)-1,3,5-triazine-2,4,6(1H,3H,5H)-trione, 4,4',4"-(1-methylpropanyl-3-ylidene)tris(6-tert-butyl-m-cresol), 6,6'-di-tert-butyl-4,4'-butylidenedi-m-cresol, octadecyl 3-(3,5-di-tert-butyl-4-hydroxyphenyl)propionate, pentaerythritol-tetrakis[3-(3,5-di-tert-butyl-4-hydroxyphenyl)propionate], 3,9-bis{2-[3-(3-tert-butyl-4-hydroxy-5-methylphenyl)propionyloxy]-1,1-dimethylethyl}-2,4,8,10-tetraoxospiro[5.5] undecane, and pentaerythritol-tetrakis[3-(3,5-di-tert-butyl-4-hydroxyphenyl)propionate]. Among these, pentaerythritol-tetrakis[3-(3,5-di-tert-butyl-4-hydroxyphenyl)propionate] is preferable.

Examples of the phosphite-based antioxidant may include 2-ethylhexyl diphenyl phosphite, isodecyl diphenyl phosphite, triisodecyl phosphite, triphenyl phosphite, 3,9-bis (octadecyloxy)-2,4,8,10-tetraoxy-3,9-diphosphaspiro[5.5] undecane, 3,9-bis(2,6-di-tert-butyl-4-methylphenoxy)-2,4,8,10-tetraoxa-3,9-diphosphaspiro[5.5]undecane, 2,2'-methylenebis(4,6-di-tert-butylphenyl)2-ethylhexyl phosphite, tris(2,4-ditert-butylphenyl) phosphite, tris(nonylphenyl) phosphite, tetra-C12-15-alkyl(propane-2,2-diyl-bis(4,1-phenylene)) bis(phosphite), and 3,9-bis(2,6-di-tert-butyl-4-methylphenoxy)-2,4,8,10-tetraoxa-3,9-diphosphaspiro[5.5]undecane. Among these, 3,9-bis(2,6-di-tert-butyl-4-methylphenoxy)-2,4,8,10-tetraoxa-3,9-diphosphaspiro[5.5]undecane is preferable.

As such antioxidants, the aforementioned compounds may be used alone as a single type, or may also be used as a mixture of two or more types.

The antioxidant is preferably comprised in the thermoplastic resin composition in an amount of 0.01% by mass to 1% by mass, with respect to the total mass of the resin composition. The content of the antioxidant in the thermoplastic resin composition is more preferably 0.05% by mass to 0.5% by mass, and is particularly preferably 0.08% by mass to 0.3% by mass.

<Mold Release Agent >

The thermoplastic resin composition preferably comprises a mold release agent as an additive described above.

Examples of the mold release agent may include ester compounds including glycerin fatty acid esters such as mono/diglyceride of glycerin fatty acid, glycol fatty acid esters such as propylene glycol fatty acid ester and sorbitan fatty acid ester, higher alcohol fatty acid esters, full esters of aliphatic polyhydric alcohol and aliphatic carboxy acid, and monofatty acid esters. When an ester of aliphatic polyhydric alcohol and aliphatic carboxy acid is used as a mold release agent, any of a monoester, a full ester, and the like can be adopted. For example, those other than full esters, such as a monoester, may be used.

Specific examples of the mold release agent may include the following substances: namely,

- sorbitan fatty acid esters, such as sorbitan stearate, sorbitan laurate, sorbitan oleate, sorbitan trioleate, sorbitan tribehenate, sorbitan stearate, sorbitan tristearate, and sorbitan caprylate;
- propylene glycol fatty acid esters, such as propylene glycol monostearate, propylene glycol monooleate, propylene glycol monobehenate, propylene glycol monolaurate, and propylene glycol monopalmitate;
- higher alcohol fatty acid esters, such as stearyl stearate;
- glycerin fatty acid ester monoglycerides, which include: monoglycerides including glycerin monostearate, glycerin monohydroxystearate such as glycerin mono-12-hydroxystearate, glycerin monooleate, glycerin monobehenate, glycerin monocaprylate, glycerin monocaprate and glycerin monolaurate; and mono/diglycerides including glycerin mono/distearate, glycerin mono/distearate, glycerin mono/dibehenate, glycerin mono/dioleate;
- acetylated monoglycerides of glycerin fatty acid esters, such as glycerin diacetomonolaurate;
- organic acid monoglycerides of glycerin fatty acid esters, such as citric acid fatty acid monoglyceride, succinic acid fatty acid monoglyceride, and diacetyl tartaric acid fatty acid monoglyceride; and
- polyglycerin fatty acid esters, such as diglycerin stearate, diglycerin laurate, diglycerin oleate, diglycerin monostearate, diglycerin monolaurate, diglycerin monomyristate, diglycerin monooleate, tetraglycerin stearate, decaglycerin laurate, decaglycerin oleate, and polyglycerin polyricinoleate.

The mold release agent is preferably comprised in the thermoplastic resin composition in an amount of 0.01% by mass to 1% by mass, with respect to the total mass of the resin composition. The content of the mold release agent in the thermoplastic resin composition is more preferably 0.05% by mass to 0.5% by mass, and is particularly preferably 0.08% by mass to 0.3% by mass.

Method for Producing Thermoplastic Resin Composition

The method for producing a thermoplastic resin composition is not particularly limited, and the thermoplastic resin composition can be produced according to a known method. In one embodiment, the method for producing a thermoplastic resin composition comprises a step of mixing a thermoplastic resin with a compounding agent. The method for producing a thermoplastic resin composition may further comprise a step of mixing at least one of solvents and additives into the thermoplastic resin and the compounding agent. For example, a compounding agent and additives are successively or simultaneously added to a thermoplastic resin, and are then mixed therewith, so that a resin composition can be produced. The mixing step can be carried out according to an ordinary method, and examples of the ordinary method applied herein may include a kneading method of using an extruder, and a method comprising dissolving a thermoplastic resin and a compounding agent in each different solvent (for example, methylene chloride, THF, etc.) to prepare each solution, and then mixing the two solutions with each other.

2. Molded Body

The thermoplastic resin composition of the present invention can be preferably used in an optical member. In one embodiment of the present invention, the optical member may include, but is not limited to, an optical disk, a transparent conductive substrate, an optical card, a sheet, a film, an optical fiber, a lens, a prism, an optical film, a substrate, an optical filter, a hard coat film, and the like. The thermoplastic resin composition of the present invention has high fluidity, and can be molded according to a cast method. Hence, the present thermoplastic resin composition is preferably used, in particular, in production of a thin optical member. In a preferred embodiment of the present invention, the optical member produced using the thermoplastic resin composition of the present invention may be an optical lens. In another preferred embodiment of the present invention, the optical member produced using the thermoplastic resin composition of the present invention may be an optical film.

When an optical member comprising the thermoplastic resin composition of the present invention is produced according to injection molding, the optical member is preferably molded under conditions of a cylinder temperature of 260 °C to 350 °C and a mold temperature of 90 °C to 170 °C. The optical member is more preferably molded under conditions of a cylinder temperature of 270 °C to 320 °C and a mold temperature of 100 °C to 160 °C. When the cylinder temperature is higher than 350 °C, the resin composition is decomposed and colored. On the other hand, when the cylinder temperature is lower than 260 °C, the melt viscosity becomes high, and it is likely to become difficult to mold the optical member. Moreover, when the mold temperature is higher than 170 °C, it is likely to become difficult to remove a molded piece composed of the resin composition from a mold. On the other hand, when the mold temperature is lower than 90 °C, the resin is hardened too quickly in the mold upon the molding thereof, and it becomes difficult to control the shape of a molded piece, or it is likely to become difficult to sufficiently transcribe a vehicle placed in a mold.

EXAMPLES

Hereinafter, the examples of the present invention will be described together with comparative examples, and the content of the present invention will be described in detail. However, these examples are not intended to limit the scope of the present invention.

<Viscosity Average Molecular Weight (Mv) >

Viscosity average molecular weight (Mv) was measured in accordance with JIS: K 7367-1.

Measurement apparatus: Ubbelohde capillary viscometer
Solvent: Dichloromethane
Resin solution concentration: 0.5 g/dl
Measurement temperature: 25 °C.

The measurement was carried out under the above-described conditions, the limiting viscosity [η] (dl/g) was then obtained with a Huggins constant of 0.45, and the viscosity average molecular weight (Mv) was then calculated according to the following equation:

$$\eta=1.23\times10^{-4}\times Mv^{0.83}$$

<Set Number n >

The set number n was calculated according to the following equation, in which the amount of substance (mole) of a diol was defined to be "a" and the amount of substance (mole) of an end terminator was defined to be "b". It is to be noted that the set number n of a monomer is "0" without the association of an end terminator.

$$n=\frac{a\times 2}{b}$$

<Average Number of Repeating Units Obtained by Mass Spectrometry Measurement According to Field Desorption Mass Spectrometry (FD-MS) >

Apparatus: JMS-T200GC AccuTOF GCx-plus, manufactured by JEOL Ltd.

Emitter: Emitter, manufactured by JEOL Ltd.

Electric current-increasing rate: 51.2 mA/min

Maximum current value: 40 mA

Sample concentration: 1 mg/ml

Sample amount: 1 ul

Ionization mode: FD (Positive)

Counter electrode voltage: −10 kV

Measurement time: 0 to 1.2 min

Measured mass range: m/z 50 to 3200

Spectrum recording interval: 0.5 seconds

The mass peak m/z of the aromatic carbonate oligomer obtained by the above-described measurement was divided by the molecular weight of a monomer unit to calculate the average number of repeating units of the aromatic carbonate oligomer.

<Glass Transition Temperature (Tg, Unit: °C) >

The Tg of the thermoplastic resin composition was measured using the following apparatus under the following conditions.

Differential scanning calorimeter (DSC): "DSC7000X," manufactured by Hitachi High-Tech Science Corporation Measurement method: JIS K7211

Measurement conditions: 5 mg of a sample; under a nitrogen gas atmosphere; temperature increasing condition: 10 °C/min <Birefringence >

A pelletized thermoplastic resin composition was dried at 120 °C for 5 hours, and was then subjected to injection molding, using an injection molding machine SE50, manufactured by Sumitomo Heavy Industries, Ltd., to obtain a test piece that was a two-stage plate (35 mm×100 mm) having a thickness of 1 mm and a thickness of 3 mm. When the used thermoplastic resin was a bisphenol A-type aromatic polycarbonate resin (S-3000), the injection molding was carried out at a cylinder temperature of 280 °C and at a mold temperature of 80 °C. On the other hand, when the used thermoplastic resin was a bisphenol AP-type aromatic polycarbonate resin, the injection molding was carried out at a cylinder temperature of 300 °C and at a mold temperature of 100 °C.

A 3-mm part of the obtained test piece was used to measure birefringence (before annealing). Subsequently, an annealing treatment was carried out (i.e. the test piece was treated at a temperature of the Tg-20 °C of each thermoplastic resin composition for 3 hours), and the birefringence was measured (after annealing).

The birefringence was evaluated by setting the value of a 3-mm test piece obtained in Comparative Example 1 (in which "S-3000" was used as a thermoplastic resin, and no compounding agents were used) before annealing to be 100% (reference value).

It is to be noted that the birefringence was measured using the following apparatus and wavelength.

Measurement apparatus: Wide-range two-dimensional birefringence evaluation system ("WPA-200," manufactured by Photonic Lattice)

Measurement wavelength: 523 nm

<Total Light Transmittance (Unit: %) >

A pelletized thermoplastic resin composition was dried at 120 °C for 5 hours, and was then subjected to injection molding, using an injection molding machine SE50, manufactured by Sumitomo Heavy Industries, Ltd., to obtain a test piece that was a two-stage plate (35 mm×100 mm) having a thickness of 1 mm and a thickness of 3 mm. When the used thermoplastic resin was a bisphenol A-type aromatic polycarbonate resin (S-3000), the injection molding was carried out at a cylinder temperature of 280 °C and at a mold temperature of 80 °C. On the other hand, when the used thermoplastic resin was a bisphenol AP-type aromatic polycarbonate resin, the injection molding was carried out at a cylinder temperature of 300 °C and at a mold temperature of 100 °C.

The total light transmittance of the obtained test piece was measured in accordance with JIS K7375.

Measurement apparatus: Spectroscopic haze meter ("SH7000," manufactured by NIPPON DENSHOKU INDUSTRIES Co., Ltd.)

<YI>

Using the same test piece as that used in the above-described measurement of total light transmittance, YI was measured in accordance with JIS K7013.

Measurement apparatus: Spectroscopic haze meter ("SH7000," manufactured by NIPPON DENSHOKU INDUSTRIES Co., Ltd.)

<Fluidity Q Value (Unit: $cm^3/s$) >

The pellets of the obtained thermoplastic resin composition were dried at 120 °C for 4 hours, and thereafter, the fluidity Q value was measured in accordance with JIS K7210, using the following apparatus and conditions.

Measurement apparatus: Flowtester "CFT-500D," manufactured by Shimadzu Corporation Sample amount: 1 to 2 g Temperature: 280 °C.

Load: 160 kgf

<Bending Strength (Unit: MPa) >

The pellets of the obtained thermoplastic resin composition were dried at 120 °C for 5 hours, and were then subjected to injection molding, using an injection molding machine "EC75SX" (clamping force: 75 tons) manufactured by Toshiba Machine Group Engineering, under conditions of a cylinder temperature of 280 °C to 300 °C, a mold temperature of 80 °C to 100 °C, and a molding cycle of 48 seconds, so as to mold an ISO multi-purpose test piece having a thickness of 4 mm. Using this test piece (4 mm in thickness), bending strength was measured at a temperature of 23 °C in accordance with ISO178.

<Mold Contamination >

Using an injection molding machine ("SE7MII," manufactured by Sumitomo Heavy Industries, Ltd.), the pellets of the obtained thermoplastic resin composition were molded 500 shots under conditions of a cylinder temperature of 280 °C, a drop-shaped mold, and a mold temperature of 80 °C. Thereafter, the adhesion of the pellets to the mold was evaluated by visual observation according to the following criteria.

A: Almost no adherence is observed.

B: Adherence is observed.

C: A large amount of adherence is observed.

[Thermoplastic Resin]

S-3000 (Iupilon (registered trademark) S-3000, manufactured by Mitsubishi Engineering-Plastics Corporation) was used. This resin was a bisphenol A-type aromatic polycarbonate resin represented by the following structural formula, which was produced according to an interface method. The set number n of this resin was 52, and the viscosity average molecular weight thereof was 22,000.

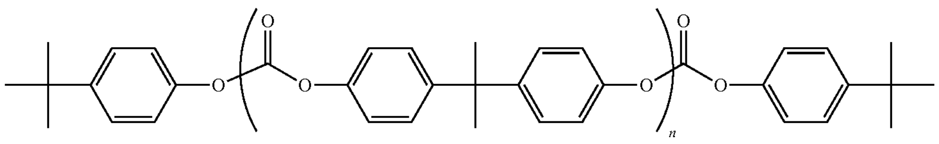

Production Example 1: Bisphenol AP-Type PC Resin (Set Number n=25)

(Step 1)

100 g of Bisphenol AP (BPAP: manufactured by Honshu Chemical Industry Co., Ltd.) and 0.5 g of hydrosulfite were added to 600 ml of a 9 w/w % sodium hydroxide aqueous solution, and were then dissolved therein. To this solution, 360 ml of dichloromethane was added, and the temperature of the obtained solution was set to be 20 °C, while stirring. Further, 47.7 g of phosgene was blown into the solution over 30 minutes.

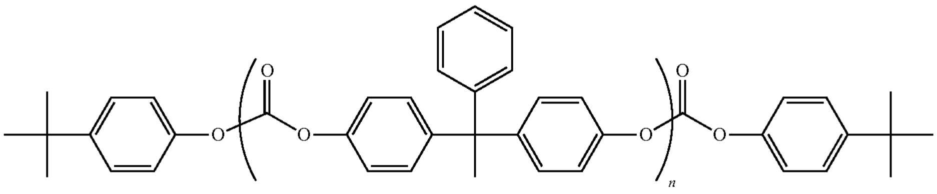

(Step 2)

After the blowing of phosgene is completed, 4.14 g of p-tert-butylphenol (PTBP) dissolved in 50 ml of dichloromethane was added to the resulting solution, and the thus obtained solution was intensively stirred for 7 minutes, so that it was emulsified. Thereafter, 0.5 ml of triethylamine was added as a polymerization catalyst to the resulting solution, and was then polymerized for about 30 minutes.

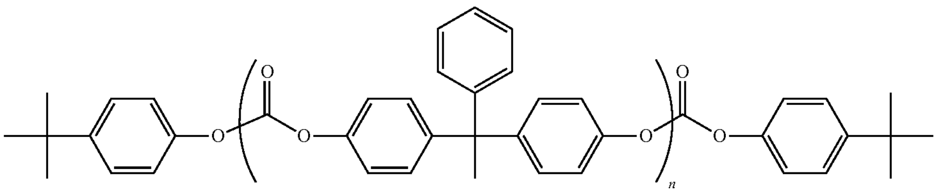

(Post-Step)

The polymerized solution was separated into a water layer and an organic layer, and the organic layer was neutralized with phosphoric acid, and was then washed with pure water repeatedly, until the pH of the washing liquid became pH 7.0. The organic solvent was distilled away from the thus purified polycarbonate resin by evaporation, so that polycarbonate resin powders were obtained. These polycarbonate resin powders were dried at 120 °C for 24 hours, so that the solvent was completely distilled away. The set number n of this resin represented by the following structural formula was 25.

The obtained polycarbonate resin had a limiting viscosity of 0.291 dl/g and a viscosity average molecular weight (Mv) of 13,000.

Production Example 2: Bisphenol AP-Type PC Resin (Set Number n=52)

A polycarbonate resin was synthesized in the same manner as that of Production Example 1, with the exception that the amount of p-tert-butylphenol (PTBP) was changed to 1.99 g. The set number n of this resin represented by the following structural formula was 52.

The obtained polycarbonate resin had a limiting viscosity of 0.419 dl/g and a viscosity average molecular weight (Mv) of 20,000.

[Compounding Agent]

Production Example 3: BCFL Oligomer (Set Number n=7)

An oligomer was synthesized in the same manner as that of Production Example 1, with the exceptions that bisphenol AP (BPAP) was changed to biscresol fluorene (BCFL: manufactured by Honshu Chemical Industry Co., Ltd.) represented by the following structural formula, and that the amount of p-tert-butylphenol (PTBP) was changed to 11.35 g. The set number n of the obtained oligomer was 7.

The obtained oligomer had a limiting viscosity of 0.103 dl/g and a viscosity average molecular weight (Mv) of 5,000.

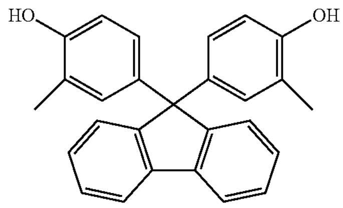 [SMILES: Cc1cc(C2(c3ccc(O)c(C)c3)c3ccccc3-c3ccccc32)ccc1O]

Production Example 4: BCFL Oligomer (Set Number n=10)

An oligomer was synthesized in the same manner as that of Production Example 3, with the exception that the amount of PTBP was changed to 7.94 g. The set number n of the obtained oligomer was 10.

The obtained oligomer had a limiting viscosity of 0.127 dl/g and a viscosity average molecular weight (Mv) of 6,000.

Production Example 5: BCFL Oligomer (Set Number n=3)

An oligomer was synthesized in the same manner as that of Production Example 3, with the exception that the amount of PTBP was changed to 26.48 g. The set number n of the obtained oligomer was 3.

The obtained oligomer had a limiting viscosity of 0.068 dl/g and a viscosity average molecular weight (Mv) of 3,700.

Production Example 6: BCFL-BPAP Copolymerized Oligomer (Set Number n=10)

An oligomer was synthesized in the same manner as that of Production Example 1, with the exceptions that the amount of BPAP was changed to 7.90 g, that 92.1 g of BCFL was further added, and that the amount of PTBP was set to be 8.13 g. The set number n of the obtained oligomer was 10.

The obtained oligomer had a limiting viscosity of 0.156 dl/g and a viscosity average molecular weight (Mv) of 7,200.

Production Example 7: BNE Oligomer (BNE:DPC=1:1.36 (Moles))

Raw materials, namely, 84.38 g (0.2253 moles) of 2,2'-bis(2-hydroxyethoxy)-1,1'-binaphthalene (BNE) represented by the following structural formula, 65.12 g (0.3042 moles) of DPC, and $2.21\times10^{-4}$ g ($2.63\times10^{-6}$ moles) of sodium hydrogen carbonate were placed in a 500-mL reactor equipped with a stirrer and a distillation apparatus, and the inside of the reactor was then substituted with nitrogen. Thereafter, the mixture was heated to 205 °C over 1 hour in a nitrogen atmosphere under a pressure of 760 Torr, and was stirred. After the raw materials had been completely dissolved, the pressure reduction degree was adjusted to 150 Torr over 15 minutes, and the reaction mixture was then retained under conditions of 205 °C and 150 Torr for 20 minutes, so as to carry out a transesterification reaction. Further, the temperature was increased to 240 °C at a rate of 37.5 °C/hr, and was then retained at 240 °C under a pressure of 150 Torr for 10 minutes. Thereafter, the pressure reduction degree was adjusted to 120 Torr over 10 minutes, and the reaction mixture was then retained at 240 °C under a pressure of 120 Torr for 70 minutes. Thereafter, the pressure reduction degree was adjusted to 100 Torr over 10 minutes, and the reaction mixture was then retained at 240 °C under a pressure of 100 Torr for 10 minutes. Further, the pressure reduction degree was adjusted to 1 Torr or less over 40 minutes, and the reaction was terminated. Nitrogen was blown into the reactor, followed by pressurization, and the generated carbonate oligomer was then removed from the reactor. The average number of repeating units of the obtained carbonate oligomer, which was measured by mass spectrometry measurement according to field desorption mass spectrometry (FD-MS), was 3, and the mass average molecular weight measured by GPC was 1400. Specifically, the obtained carbonate oligomer was subjected to mass spectrometry, and the mass number was divided by the molecular weight of the BNE monomer unit, so that the average number of repeating units was calculated to be 3.

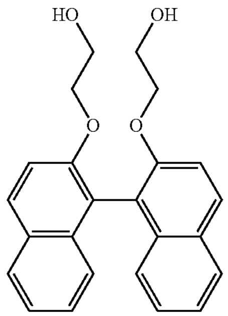

Production Example 8: BCFL Oligomer (Set Number n=15)

An oligomer was synthesized in the same manner as that of Production Example 3, with the exception that the amount of PTBP was changed to 5.30 g. The set number n of the obtained resin was 15.

The obtained oligomer was not dissolved in dichloromethane (a cloudy white solution was obtained), and it was impossible to measure the limiting viscosity and the viscosity average molecular weight (Mv) thereof.

Examples 1 to 15 and Comparative Examples 1 to 9

A thermoplastic resin, a compounding agent, and additives were mixed with one another at a ratio shown in each of the following Tables 1 and 2, and the obtained mixture was then blended using a tumbler for 20 minutes. Thereafter, the resulting mixture was kneaded in a single-screw extruder ("VS50-34V," manufactured by TANABE PLASTICS MACHINERY CO., LTD.) equipped with a vent having a screw diameter of 50 mm, at a cylinder temperature of 280 °C to 320 °C and at a screw rotation number of 80 rpm. The extruded strand was cut to obtain a pelletized thermoplastic resin composition. The evaluation results are shown in the following Tables 1 and 2.

Besides, the oligomer obtained in Production Example 8 was kneaded in the same manner as that of Example 1, with the exception that the amount of the oligomer was set at 10% by mass and the amount of S-3000 was set at 90% by mass. As a result, a molded body, the physical properties of which could be stably measured, could not be obtained.

TABLE 1

| Resin, compounding agent, and additives | | | Set number n | Unit | Comp. Ex. 1 | Ex. 1 | Ex. 2 | Ex. 3 | Ex. 4 | Comp. Ex. 2 | Ex. 5 |
|---|---|---|---|---|---|---|---|---|---|---|---|
| Thermoplastic resin | S-3000 (Biosphenol A-type PC resin) | Commercial product | 52 | mass % | 100 | 90 | 90 | 90 | 90 | 90 | 90 |
| | Bisphenol AP-type PC resin | Production Ex. 1 | 25 | mass % | | | | | | | |
| | Bisphenol AP-type PC resin | Production Ex. 2 | 52 | mass % | | | | | | | |
| Compounding agent | BCFL oligoner, n = 10 | Production Ex. 4 | 10 | mass % | | 10 | | | | | |
| | BCFL oligoner, n = 7 | Production Ex. 3 | 7 | mass % | | | 10 | | | | |
| | BCFL oligoner, n = 3 | Production Ex. 5 | 3 | mass % | | | | 10 | | | |
| | BCFL-BPAP copolymerized oligomer, n = 10 | Production Ex. 6 | 10 | mass % | | | | | 10 | | |
| | BCFL monomer | Commercial product | 0 | mass % | | | | | | 10 | |
| | BNE oligomer (BNE:DPC = 1:1.36 (moles)) | Production Ex. 7 | — | mass % | | | | | | | 10 |
| | BNE monomer | Commercial product | 0 | mass % | | | | | | | |
| Additives | Antioxidant | AS2112 | | mass % | 0.1 | 0.1 | 0.1 | 0.1 | 0.1 | 0.1 | 0.1 |
| | Release agent | S-100A | | mass % | 0.1 | 0.1 | 0.1 | 0.1 | 0.1 | 0.1 | 0.1 |
| Physical properties | Tg | | | ° C. | 143 | 140 | 140 | 138 | 140 | 132 | 125 |
| | Q value | | | $cm^3/sec$ | 14 | 15 | 15 | 18 | 15 | 25 | 40 |
| | Birefringence | Before annealing | | % | 100 | 90 | 90 | 88 | 92 | 85 | 82 |
| | | After annealing | | % | 67 | 61 | 61 | 58 | 63 | 55 | 52 |
| | Total light transmittance | | | % | 90 | 90 | 90 | 90 | 90 | 89 | 90 |
| | YI | | | — | 1 | 1 | 1 | 1 | 1 | 4 | 2 |
| | Bending strength | | | MPa | 90 | 65 | 65 | 60 | 70 | 30 | 40 |
| | Mold contamination | | | — | A | A | A | A | A | C | B |

| Resin, compounding agent, and additives | | | Set number n | Unit | Comp. Ex. 3 | Comp. Ex. 4 | Ex. 6 | Ex. 7 | Comp. Ex. 5 | Comp. Ex. 6 |
|---|---|---|---|---|---|---|---|---|---|---|
| Thermoplastic resin | S-3000 (Biosphenol A-type PC resin) | Commercial product | 52 | mass % | 90 | | | | | |
| | Bisphenol AP-type PC resin | Production Ex. 1 | 25 | mass % | | 100 | 90 | 90 | 90 | 90 |
| | Bisphenol AP-type PC resin | Production Ex. 2 | 52 | mass % | | | | | | |
| Compounding agent | BCFL oligoner, n = 10 | Production Ex. 4 | 10 | mass % | | | 10 | | | |
| | BCFL oligoner, n = 7 | Production Ex. 3 | 7 | mass % | | | | 10 | | |
| | BCFL oligoner, n = 3 | Production Ex. 5 | 3 | mass % | | | | | | |
| | BCFL-BPAP copolymerized oligomer, n = 10 | Production Ex. 6 | 10 | mass % | | | | | | |
| | BCFL monomer | Commercial product | 0 | mass % | | | | | 10 | |
| | BNE oligomer (BNE:DPC = 1:1.36 (moles)) | Production Ex. 7 | — | mass % | | | | | | |
| | BNE monomer | Commercial product | 0 | mass % | 10 | | | | | 10 |
| Additives | Antioxidant | AS2112 | | mass % | 0.1 | 0.1 | 0.1 | 0.1 | 0.1 | 0.1 |
| | Release agent | S-100A | | mass % | 0.1 | 0.1 | 0.1 | 0.1 | 0.1 | 0.1 |
| Physical properties | Tg | | | ° C. | 125 | 174 | 172 | 172 | 160 | 154 |
| | Q value | | | $cm^3/sec$ | — | 9 | 12 | 12 | 19 | 25 |
| | Birefringence | Before annealing | | % | 80 | 80 | 75 | 75 | 69 | 70 |
| | | After annealing | | % | 50 | 61 | 40 | 39 | 35 | 42 |
| | Total light transmittance | | | % | 89 | 89 | 89 | 89 | 89 | 88 |
| | YI | | | — | 3 | 1 | 1 | 1 | 4 | 3 |
| | Bending strength | | | MPa | 25 | 120 | 80 | 80 | 70 | 40 |
| | Mold contamination | | | — | C | A | A | A | C | C |

TABLE 2

| Resin, compounding agent, and additives | | | Set number n | Unit | Comp. Ex. 7 | Ex. 8 | Ex. 9 | Ex. 10 | Ex. 11 | Ex. 12 |
|---|---|---|---|---|---|---|---|---|---|---|
| Thermoplastic resin | S-3000 (Biosphenol A-type PC resin) | Commercial product | 52 | mass % | | | | | | |
| | Bisphenol AP-type PC resin | Production Ex. 1 | 25 | mass % | | | | | | |
| | Bisphenol AP-type PC resin | Production Ex. 2 | 52 | mass % | 100 | 95 | 90 | 80 | 90 | 80 |
| Compounding agent | BCFL oligoner, n = 10 | Production Ex. 4 | 10 | mass % | | 5.0 | 10 | 20 | | |
| | BCFL oligoner, n = 7 | Production Ex. 3 | 7 | mass % | | | | | 10 | 20 |
| | BCFL oligoner, n = 3 | Production Ex. 5 | 3 | mass % | | | | | | |
| | BCFL-BPAP copolymerized oligomer, n = 10 | Production Ex. 6 | 10 | mass % | | | | | | |
| | BCFL monomer | Commercial product | 0 | mass % | | | | | | |
| | BNE oligomer (BNE:DPC = 1:1.36 (moles) | Production Ex. 7 | — | mass % | | | | | | |
| | BNE monomer | Commercial product | 0 | mass % | | | | | | |
| Additives | Antioxidant | AS2112 | | mass % | 0.1 | 0.1 | 0.1 | 0.1 | 0.1 | 0.1 |
| | Release agent | S-100A | | mass % | 0.1 | 0.1 | 0.1 | 0.1 | 0.1 | 0.1 |
| Physical properties | Tg | | | ° C. | 181 | 180 | 178 | 177 | 178 | 177 |
| | Q value | | | $cm^3/sec$ | 1 | 1 | 3 | 4 | 3 | 4 |
| | Birefringence | Before annealing | | % | 90 | 84 | 79 | 68 | 79 | 68 |
| | | After annealing | | % | 68 | 58 | 52 | 44 | 49 | 40 |

TABLE 2-continued

| | | | | | | | |
|---|---|---|---|---|---|---|---|
| Total light transmittance | % | 89 | 89 | 89 | 89 | 89 | 89 |
| YI | — | 1 | 1 | 1 | 2 | 1 | 2 |
| Bending strength | MPa | 120 | 100 | 80 | 50 | 80 | 50 |
| Mold contamination | — | A | A | A | A | A | A |

| Resin, compounding agent, and additives | | | Set number n | Unit | Ex. 13 | Ex. 14 | Comp. Ex. 8 | Ex. 15 | Comp. Ex. 9 |
|---|---|---|---|---|---|---|---|---|---|
| Thermoplastic resin | S-3000 (Biosphenol A-type PC resin) | Commercial product | 52 | mass % | | | | | |
| | Bisphenol AP-type PC resin | Production Ex. 1 | 25 | mass % | | | | | |
| | Bisphenol AP-type PC resin | Production Ex. 2 | 52 | mass % | 90 | 90 | 90 | 90 | 90 |
| Compounding agent | BCFL oligoner, n = 10 | Production Ex. 4 | 10 | mass % | | | | | |
| | BCFL oligoner, n = 7 | Production Ex. 3 | 7 | mass % | | | | | |
| | BCFL oligoner, n = 3 | Production Ex. 5 | 3 | mass % | 10 | | | | |
| | BCFL-BPAP copolymerized oligomer, n = 10 | Production Ex. 6 | 10 | mass % | | 10 | | | |
| | BCFL monomer | Commercial product | 0 | mass % | | | 10 | | |
| | BNE oligomer (BNE:DPC = 1:1.36 (moles) | Production Ex 7 | — | mass % | | | | 10 | |
| | BNE monomer | Commercial product | 0 | mass % | | | | | 10 |
| Additives | Antioxidant | AS2112 | | mass % | 0.1 | 0.1 | 0.1 | 0.1 | 0.1 |
| | Release agent | S-100A | | mass % | 0.1 | 0.1 | 0.1 | 0.1 | 0.1 |
| Physical properties | Tg | | | ° C. | 176 | 178 | 169 | 168 | 161 |
| | Q value | | | $cm^3/sec$ | 4 | 3 | 8 | 6 | 10 |
| | Birefringence | Before annealing | | % | 78 | 81 | 72 | 75 | 72 |
| | | After annealing | | % | 47 | 55 | 46 | 50 | 45 |
| | Total light transmittance | | | % | 89 | 89 | 87 | 89 | 88 |
| | YI | | | — | 1 | 1 | 5 | 2 | 3 |
| | Bending strength | | | MPa | 70 | 80 | 40 | 45 | 35 |
| | Mold contamination | | | — | A | A | C | B | C |

As shown in Tables 1 and 2, the resin composition of the present invention is a thermoplastic resin composition having an excellent birefringence-reducing effect without impairing the properties of optical resin compositions. According to the present invention, optical members such as optical lenses and optical films can be molded from this resin composition by precision molding.

The invention claimed is:

1. A thermoplastic resin composition, comprising a thermoplastic resin, and an aromatic carbonate oligomer (A) serving as a compounding agent, in which a set number n is 3 or more and less than 15 or an average number of repeating units obtained by mass spectrometry measurement according to field desorption mass spectrometry (FD-MS) is 2 to 6, wherein the aromatic carbonate oligomer (A) comprises a diol-derived constituent unit represented by or the following formula (1a):

(1a)

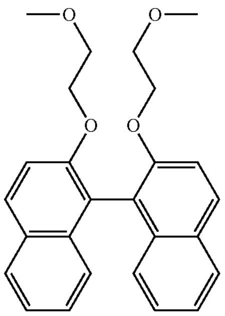

wherein the thermoplastic resin comprises at least one selected from the group consisting of bisphenol A-type polycarbonate resin capped with p-tert butylphenol and bisphenol AP-type polycarbonate resin capped with p-tert butylphenol, wherein the compounding agent is comprised in an amount of 5% by mass to 20% by mass, based on a total mass of the thermoplastic resin composition, the aromatic carbonate oligomer (A) is a polymer having a molar ratio of the diol represented by the general formula (1a):diphenyl carbonate=1:1.2 to 1:10.0, the set number n of the thermoplastic resin is 25 to 52, and an antioxidant and/or a mold release agent are further comprised in each amount of 0.08% by mass to 0.3% by mass, based on a total mass of the thermoplastic resin composition.

2. The thermoplastic resin composition according to claim 1, wherein the set number n of the aromatic carbonate oligomer (A) is 3 or more and 10 or less.

3. A molded body, comprising the thermoplastic resin composition according to claim 1.

* * * * *